US012499666B2

(12) United States Patent
Chai et al.

(10) Patent No.: US 12,499,666 B2
(45) Date of Patent: Dec. 16, 2025

(54) METHOD AND SYSTEM FOR GENERATING TEST CASES FOR VISUAL TRAIN POSITIONING

(71) Applicant: Beijing Jiaotong University, Beijing (CN)

(72) Inventors: Ming Chai, Beijing (CN); Dong Xie, Beijing (CN); Hongjie Liu, Beijing (CN); Shuai Su, Beijing (CN); Jidong Lv, Beijing (CN)

(73) Assignee: BEIJING JIAOTONG UNIVERSITY, Beijing (CN)

( * ) Notice: Subject to any disclaimer, the term of this patent is extended or adjusted under 35 U.S.C. 154(b) by 394 days.

(21) Appl. No.: 18/130,169

(22) Filed: Apr. 3, 2023

(65) Prior Publication Data

US 2024/0020959 A1 Jan. 18, 2024

(30) Foreign Application Priority Data

Jul. 18, 2022 (CN) .......................... 202210844044.7

(51) Int. Cl.
*G06V 10/77* (2022.01)
*G06T 5/50* (2006.01)
(Continued)

(52) U.S. Cl.
CPC .............. *G06V 10/776* (2022.01); *G06T 5/50* (2013.01); *G06T 7/70* (2017.01); *G06V 10/761* (2022.01);
(Continued)

(58) Field of Classification Search
CPC .. G06V 10/776; G06V 10/761; G06V 10/764; G06V 10/774; G06V 20/56; G06V 10/82; G06V 2201/08; G06T 5/50; G06T 7/70; G06T 2207/20081; G06T 2207/20084; G06T 2207/20221;
(Continued)

(56) References Cited

FOREIGN PATENT DOCUMENTS

| CN | 111861894 | * | 4/2019 |
| CN | 113076685 | * | 3/2021 |
| CN | 114004787 | * | 4/2021 |

OTHER PUBLICATIONS

Machine translation for CN 111861894 (Year: 2019).*
(Continued)

*Primary Examiner* — Qian Yang
(74) *Attorney, Agent, or Firm* — CM Law PLLC; Robert C. Klinger (57) ABSTRACT

A method and system for generating test cases for visual train positioning are provided and relate to the technical field of train positioning. The method includes: first obtaining real environment images around a train, and classifying the real environment images based on blur types; training a generative adversarial network (GAN)-based image generation network with each non-blurred training image, each blurred training image of any blur type in a same scenario and a preset blur type as inputs, and a reconstructed blurred image and a corresponding blur type as outputs, to obtain an image generation model; then inputting each real non-blurred image and target reference data into the image generation model to generate a target reconstructed blurred image, and then deleting target reconstructed blurred images with structural similarities lower than a set threshold.

10 Claims, 5 Drawing Sheets

(51) Int. Cl.
*G06T 7/70* (2017.01)
*G06V 10/74* (2022.01)
*G06V 10/764* (2022.01)
*G06V 10/774* (2022.01)
*G06V 10/776* (2022.01)

(52) U.S. Cl.
CPC .......... *G06V 10/764* (2022.01); *G06V 10/774* (2022.01); *G06T 2207/20081* (2013.01); *G06T 2207/20084* (2013.01); *G06T 2207/20221* (2013.01)

(58) Field of Classification Search
CPC . G06T 2207/20056; G06T 2207/20076; G06T 7/74; G06T 2207/30168; G06T 11/00; G06T 7/0002; G06T 7/73
See application file for complete search history.

(56) References Cited

OTHER PUBLICATIONS

Machine translation for CN 113076685 (Year: 2021).*
Machine translation for CN 114004787 (Year: 2021).*
Gao et al., "Generative Adversarial Networks for Road Crack Image Segmentation", IJCNN 2019. International Joint Conference on Neural Networks. Budapest, Hungary. 14-19 (Year: 2019).*
Ahmad et al., "FPN-GAN: Multi-class Small Object Detection in Remote Sensing Images", 2021 IEEE 6th International Conference on Cloud Computing and Big Data Analytics (Year: 2021).*

* cited by examiner

METHOD AND SYSTEM FOR GENERATING TEST CASES FOR VISUAL TRAIN POSITIONING

CROSS REFERENCE TO RELATED APPLICATION

This patent application claims the benefit and priority of Chinese Patent Application No. 202210844044.7 filed Jul. 18, 2022, the disclosure of which is incorporated by reference herein in its entirety as part of the present application.

TECHNICAL FIELD

The present disclosure relates to the technical field of train positioning, and in particular, to a method and system for generating test cases for visual train positioning in a motion-blurred scenario.

BACKGROUND

In a train operation control system, train positioning is a very important and key technology. An accurate, safe and highly reliable train positioning technology is the basis to allow trains to run safely, function efficiently and provide the best service.

A conventional train positioning method is completed by means of a trackside device such as a transponder, and is implemented in a manner of combining vehicle-mounted relative position calculation with trackside absolute position correction, which requires the arrangement of a large number of devices beside a track, and there are problems such as high construction and maintenance costs, an unknown initial position of a train, and low recovery efficiency after signal failure and degradation. In recent years, with the rapid development of an artificial intelligence technology, a method for visual positioning based on deep learning-based image recognition has become an effective means and development trend to implement train positioning. Currently, vision-based train positioning is performed mainly by training a deep neural network model, identifying image information (such as extracting environmental image features or detecting and identifying visual tags), and obtaining position information in real time, so as to implement accurate train positioning.

However, deep learning is essentially unexplainable, and there is the possibility of giving wrong results with high confidence, which leads to serious consequences, such as frequent accidents of autonomous vehicles such as Tesla, Google, etc. in recent years. A train operation control system is a typical safety-critical system. In the application of a visual train positioning technology based on deep learning to such system, how to ensure the safety of positioning has become a key issue. Strict testing can effectively expose the problems and reveal hidden dangers of the model, and is an important means to ensure the safety of train positioning. Therefore, it is very necessary to completely test the visual positioning model based on deep learning before the model is put into use.

One of the core problems in testing the deep learning model in visual train positioning is how to generate complete test images as test cases. In a visual train positioning test, test images obtained from a real environment have the problem of uneven distribution, poor diversity and high similarity, and thus such test images is weak in exposing problems when being directly used as test cases, which cannot meet the completeness requirements of the test. A typical scenario in which visual train positioning errors easily occur has complex interferences to images, and the interferences appear less frequently and are difficult to reproduce in a real environment.

Therefore, there is an urgent need in this field for a technical solution that can provide images meeting completeness requirements of a test and capable of reflecting a real environment.

SUMMARY

An objective of the present disclosure is to provide a method and system for generating test cases of visual train positioning, in which a generative adversarial network (GAN)-based image generation network is trained by using real environment images around a train, to obtain an image generation model, and blurred images and corresponding blur types are generated according to original non-blurred images by using the image generation model, so that blurred images of various types and different scenarios can be obtained, which can solve the problems in the prior art that completeness requirements of a test cannot be met and obtained images appear less frequently and are difficult to reproduce in a real environment.

To achieve the above objective, the present disclosure provides the following solutions:

A method for generating test cases for visual train positioning includes:
  obtaining real environment images around a train;
  classifying the real environment images based on blur types to obtain a plurality of blur types of blurred training images;
  training a GAN-based image generation network with each non-blurred training image, each blurred training image of any blur type in a same scenario and a preset blur type as inputs, and a reconstructed blurred image and a corresponding blur type as outputs, to obtain an image generation model, where a scenario of the reconstructed blurred image is the same as a scenario of the non-blurred training image, and the blur type of the reconstructed blurred image is the same as the blur type of the blurred training image or the preset blur type;
  inputting each real non-blurred image and target reference data into the image generation model to generate a target reconstructed blurred image and corresponding blur types, where the target reference data is a reference blurred image or a specified blur type, and the reference blurred image is in a same scenario as the real non-blurred image;
  calculating a structural similarity between the target reconstructed blurred image and the real non-blurred image; and
  deleting, from generated target reconstructed blurred images, target reconstructed blurred images with structural similarities lower than a set threshold to obtain test cases.

In some embodiments, each blur type includes a blur angle and a blur intensity.

In some embodiments, the training a GAN-based image generation network with each non-blurred training image, each blurred training image of any blur type in a same scenario and a preset blur type as inputs, and a reconstructed blurred image and a corresponding blur type as outputs, to obtain an image generation model includes:
  inputting a non-blurred training image T and a blurred training image R of any blur type in a same scenario into the GAN-based image generation network, where the GAN-based image generation network includes a deconstructor, an encoder, a reconstructor, a discriminator, and an optimizer;

obtaining a content code Tc and a blur type code Tb of the non-blurred training image T and a content code Rc and a blur type code Rb of the blurred training image R by using the deconstructor;

setting a preset blur type I;

mapping random noise into a blur type code Ib conforming to the preset blur type I by using the encoder;

performing self-reconstruction and cross-reconstruction on the content code Tc and the blur type code Tb of the non-blurred training image T, the content code Rc and the blur type code Rb of the blurred training image R and the blur type code Ib of the preset blur type I by using the reconstructor, to obtain a reconstruction result;

inputting the reconstruction result, the non-blurred training image T and the blurred training image R into the discriminator to obtain a discrimination result;

calculating each loss function based on the discrimination result and performing back propagation to obtain a gradient of each parameter of the image generation network; and optimizing each parameter of the image generation network based on the gradient by using the optimizer, and obtaining the image generation model by iteration.

In some embodiments, the performing self-reconstruction and cross-reconstruction on the content code Tc and the blur type code Tb of the non-blurred training image T, the content code Rc and the blur type code Rb of the blurred training image R and the blur type code Ib of the preset blur type I by using the reconstructor, to obtain a reconstruction result includes:

inputting the content code Tc and the blur type code Tb of the non-blurred training image T into the reconstructor for self-reconstruction to obtain a non-blurred self-reconstructed image RebT;

inputting the content code Rc and the blur type code Rb of the blurred training image R into the reconstructor for self-reconstruction to obtain a blurred self-reconstructed image RebR;

inputting the content code Tc of the non-blurred training image T and the blur type code Rb of the blurred training image R into the reconstructor for cross-reconstruction to obtain a first cross-reconstructed image CrossT1; and inputting the content code Tc of the non-blurred training image T and the blur type code Ib of the preset blur type I into the reconstructor for cross-reconstruction to obtain a second cross-reconstructed image CrossT2.

In some embodiments, the calculating each loss function based on the discrimination result includes:

calculating a reconstruction loss Loss(Reb)=0.5*(L1Loss (T, Reb7)+L1Loss(R, RebR)), where L1Loss( ) is a basic loss function, RebT represents the non-blurred self-reconstructed image, and RebR represents the blurred self-reconstructed image; and calculating a discrimination loss Loss(Dis)=0.25* (L1Loss(Dis(7), Dis(Reb7))+L1Loss(Dis(R), Dis (RebR))+L1Loss(Dis(R), Dis(CrossT1))+L1Loss(I, Dis(CrossT2))), where Dis(T) is a discrimination result of the non-blurred training image T, Dis(R) is a discrimination result of the blurred training image R, Dis(RebT) is a discrimination result of the non-blurred self-reconstructed image, Dis(RebR) is a discrimination result of the blurred self-reconstructed image, Dis(CrossT1) is a discrimination result of the first cross-reconstructed image, and Dis(CrossT2) is a discrimination result of the second cross-reconstructed image.

In some embodiments, the inputting each real non-blurred image and target reference data into the image generation model to generate a target reconstructed blurred image and corresponding blur type includes:

deconstructing, the reference blurred image by a deconstructor of the image generation model to obtain a first reference blur type code when the real non-blurred image and the reference blurred image are inputted;

deconstructing the real non-blurred image by the deconstructor of the image generation model to obtain a real image content code;

fusing the first reference blur type code and the real image content code by a reconstructor of the image generation model to reconstruct the target reconstructed blurred image that is in a same scenario as the real non-blurred image and is of a same blur type as the reference blurred images;

obtaining the blur type of the target reconstructed blurred image by the discriminator of the image generation model;

obtaining a second reference blur type code based on the specified blur type, when the real non-blurred images and the specified blur type are inputted;

deconstructing the real non-blurred image by the deconstructor of the image generation model to obtain a real image content code;

fusing the second reference blur type code and the real image content code by the reconstructor of the image generation model to reconstruct the target reconstructed blurred image that is in a same scenario as the real non-blurred image and is of a blur type being the specified blur type; and obtaining the blur type of the target reconstructed blurred images by the discriminator of the image generation model.

In some embodiments, a formula for calculating the structural similarity is as follows:

$$SSIM(x, y) = \frac{(2\mu_x\mu_y + W_1)(2\sigma_x\sigma_y + W_2)}{(\mu_x^2 + \mu_y^2 + W_1)(\sigma_x^2 + \sigma_y^2 + W_2)},$$

where $\mu_x$ and $\mu_y$ are average pixel values of a generated target reconstructed blurred image x and a real non-blurred image y, respectively, $\sigma_x$ and $\sigma_y$ are standard deviations of the generated target reconstructed blurred image x and the real non-blurred image y, respectively, and $W_1$ and $W_2$ are constants set to avoid system instability when a denominator is close to 0.

In some embodiments, after the deleting, from generated target reconstructed blurred images, target reconstructed blurred images with structural similarities lower than a set threshold to obtain test cases, the method further includes:

inputting each test case into a tested visual train positioning model; and determining that a test is passed if the visual train positioning model is capable of correctly identifying image information of the test case and correctly implementing train positioning; otherwise, determining that the test fails.

In some embodiments, the classifying the real environment images based on blur types to obtain a plurality of blur types of blurred training images includes:

calculating blur types of the real environment images by using a cepstrum method; and classifying the real environment images into the plurality of blur types of the blurred training images based on the blur types.

The present disclosure further provides a system for generating test cases of visual train positioning, including:

an image acquisition unit, configured to obtain real environment images around a train;

a blur classification unit, configured to classify the real environment images based on blur types to obtain a plurality of blur types of blurred training images;

a model training unit, configured to train a GAN-based image generation network with each non-blurred training image, each blurred training image of any blur type in a same scenario and a preset blur type as inputs, and a reconstructed blurred image and corresponding blur types as outputs, to obtain an image generation model, where a scenario of the reconstructed blurred image is the same as a scenario of the non-blurred training image, and the blur type of the reconstructed blurred image is the same as the blur type of the blurred training image or the preset blur type;

an image generation unit, configured to input each real non-blurred image and target reference data into the image generation model to generate a target reconstructed blurred image and a corresponding blur type, where the target reference data is a reference blurred image or a specified blur type, and the reference blurred image is in a same scenario as the real non-blurred image;

a similarity calculation unit, configured to calculate a structural similarity between the target reconstructed blurred image and the real non-blurred image; and an image filtering unit, configured to delete, from generated target reconstructed blurred images, target reconstructed blurred images with structural similarities lower than a set threshold to obtain test cases.

According to the embodiments provided by the present disclosure, the present disclosure discloses the following technical effects:

The present disclosure provides a method and system for generating test cases of visual train positioning. The method includes: obtaining real environment images around a train, and classifying the real environment images based on blur types; training a GAN-based image generation network with each non-blurred training image, each blurred training image of any blur type in a same scenario and a preset blur type as inputs, and a reconstructed blurred image and a corresponding blur type as outputs, to obtain an image generation model; then inputting each real non-blurred image and target reference data into the image generation model to generate a target reconstructed blurred image and a corresponding blur type, calculating a structural similarity, and then deleting target reconstructed blurred images with structural similarities lower than a set threshold. According to the present disclosure, the GAN-based image generation network is trained by using the real environment images around the train, to obtain the image generation model, and the blurred images of various types and different scenarios are obtained by using the image generation model, thereby enriching the test cases, and solving the problems in the prior art that completeness requirements of a test cannot be met and obtained images appear less frequently and are difficult to reproduce in a real environment.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure. For those of ordinary skill in the art, other accompanying drawings may still be derived from these accompanying drawings without creative efforts.

DETAILED DESCRIPTION OF THE EMBODIMENTS

The technical solutions of the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide a method and system for generating test cases for visual train positioning, in which a GAN-based image generation network is trained by using real environment images around a train, to obtain an image generation model, and blurred images and corresponding blur types are generated according to original non-blurred images by using the image generation model, so that blurred images of various types and different scenarios can be obtained, which can solve the problems in the prior art that completeness requirements of a test cannot be met and obtained images appear less frequently and are difficult to reproduce in a real environment.

According to the present disclosure, the real environment images during operation of the train are collected first, and through analysis of train operation scenarios, non-blurred images are selected as original images, and typical blurred images are selected as reference images. Then, in a perspective of image style transfer, the GAN-based image generation model is constructed and trained, the original images and the reference images are input into the GAN-based image generation model, to convert non-blurred images during the train operation into images with blur interference. Next, a structural similarity analysis algorithm is adopted to filter the generated images, images that lose practical significance because of excessively dramatic image conversion are removed, and final test cases are obtained. The test cases generated in the present disclosure are used as the input of the model to test a visual train positioning model based on a deep learning technology, which can effectively expose hidden dangers and possible problems existing in the model, and further provide guidance and basis for model developers to improve the model. According to the present disclosure, a method of artificially generating test images is designed based on an idea of image-to-image translation. In an example in which motion blur occurs in images obtained by photographing a train running at a high speed, a constructed GAN-based image generation network is designed, and iteratively trained to obtain an image generation model. In a visual train positioning test, a non-blurred image as an original image and a specified blurred scenario as a reference image are inputted into the image generation model, so that an image that is in the same scenario as the original image and is of the same blur type as the reference image can be outputted as a test case, thereby solving the problems of being difficult and inefficient in obtaining an image of an interference scenario directly from a natural real environment.

Some English abbreviations and full names thereof used in the present disclosure are as follows:

| Abbreviation | Full name |
| --- | --- |
| GAN | Generative Adversarial Network |
| LRelu | Leaky Rectified Linear Units |
| MLP | Multilayer Perceptron |
| AdaIN | Adaptive Instance Normalization |

To make the above objectives, features, and advantages of the present disclosure readily apparent, the present disclosure will be further described in detail below with reference to the accompanying drawings and the specific implementations.

Embodiment 1

Figure 1:
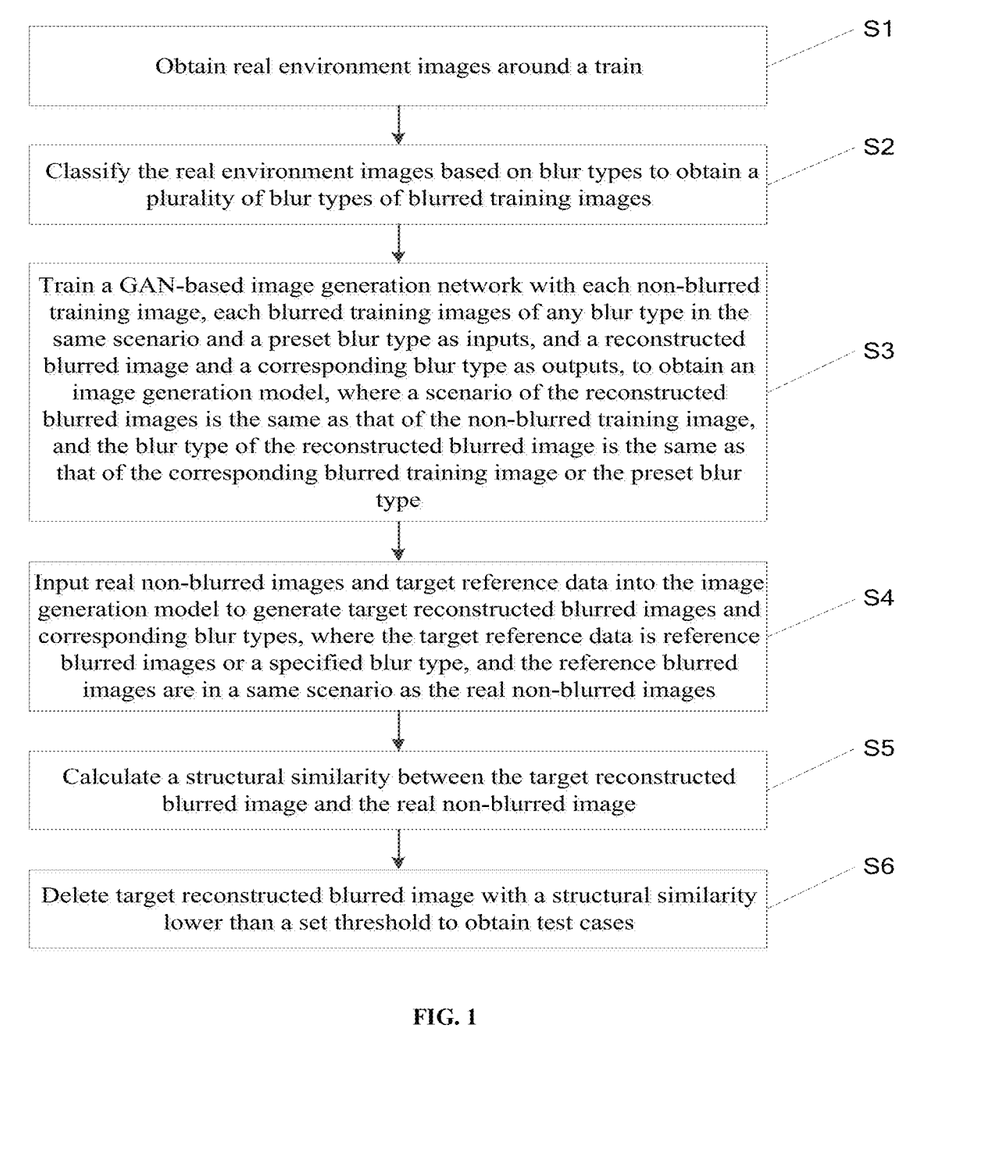
FIG. 1 is a flowchart of a method for generating test cases for visual train positioning according to Embodiment 1 of the present disclosure.

As shown in FIG. 1, the present disclosure provides a method for generating test cases for visual train positioning. Currently, implementing train positioning by utilizing computer vision is the technical development direction of rail transit. In this method, devices such as a high-speed camera are used during train operation to collect images of a surrounding environment in real time, then target identification or feature matching is performed by using a visual positioning model (usually taking a target detection YOLO series model, a convolutional neural network (CNN) model, etc. as cores). Relative or absolute position information of the train is obtained by identifying image information, and then current accurate position of the train is obtained through comprehensive processing and calculation (the visual positioning model is a tested object of this disclosure, and is not an invention point of this disclosure).

The visual positioning model needs to accurately identify image information under various complex environmental conditions, and the quality of the model directly affects accuracy and safety of train positioning results. Therefore, a complete test needs to be performed on the visual positioning model.

During high-speed operation of the train, there is relative motion between the camera and an object to be captured, and a camera device on the train vibrates, so that collected images are blurred to varying degrees. In this scenario, the visual train positioning model is prone to incorrectly identify images captured by an image acquisition device.

In this embodiment, a method of artificially generating blurred test images is designed based on the idea of image-to-image translation. A constructed GAN-based image generation network based on is designed first, and iteratively trained to obtain an image generation model. In a visual train positioning test, a non-blurred image collected in a real scenario as an original image and a specified blurred scenario as a reference image are inputted into the image generation model, so that an image that has the same content as the original image and is of the same blur type as the reference image can be outputted as a test case.

The method for generating test cases for visual train positioning in this embodiment specifically includes the following steps.

In S1, real environment images around a train are obtained.

In S2, the real environment images are classified based on blur types to obtain a plurality of blur types of blurred training images.

A real environment image library is constructed in this embodiment. Real environment images around the train during operation of the train are collected by utilizing a high-speed camera mounted on a locomotive (other image acquisition methods may also be used), and the real environment images are classified based on different blur types (a blur angle and a blur intensity), and a real environment image library is constructed. Various methods may be used to classify the blur types of the collected images. In this embodiment, a cepstrum method is used to calculate and classify the blur types of the images, with the steps as follows:

Collected real environment images around the train are grayed, and then are subjected to two-dimensional Fourier transform.

A logarithm of the Fourier transformed result is calculated, a square of the logarithm is calculated, and then is subjected to inverse Fourier transform once to obtain a cepstrum map.

The cepstrum map is dynamically compressed and cyclically shifted to center its low-frequency components.

A canny operator is used to perform edge detection on a compressed and centered spectrum map, and the spectrum map is binarized to obtain a binarized spectrum map. A dark channel image is obtained by inverting the compressed and centered spectrum map.

1°-180° radon transform of the binarized spectrum map is calculated to obtain a maximum value in a matrix after radon transform, and a column number corresponding to the maximum value plus or minus 90° is the blur angles.

The dark channel image is binarized to obtain a skeleton diagram of the dark channel, a distance d between two skeletons in the center of the image is calculated, an image height is set to H, and the blur intensity is (2*H)/d.

After blur angles and blur intensities of images are obtained, n threshold ranges are set, images with blur type values in the same range are classified into one type, and finally n types of images of different blur types are obtained.

After the classification is completed, all non-blurred images in the image library may be used as original images in the following steps, and other images with motion blur may be used as reference images. The image library is also used as a training sample for the blurred-image generation network in the following steps.

In S3, a GAN-based image generation network is trained with each non-blurred training image, each blurred training images of any blur type in the same scenario and a preset blur type as inputs, and a reconstructed blurred image and a corresponding blur type as outputs, to obtain an image generation model. A scenario of the reconstructed blurred images is the same as that of the non-blurred training image, and the blur type of the reconstructed blurred image is the same as that of the corresponding blurred training image or the preset blur type. "In the same scenario" means that the blurred training image and the non-blurred training image are in the same scenario.

In this embodiment, the GAN-based image generation network is designed first, and then is trained to obtain the image generation model. The design of the GAN-based image generation network includes the following steps.

Figure 2:
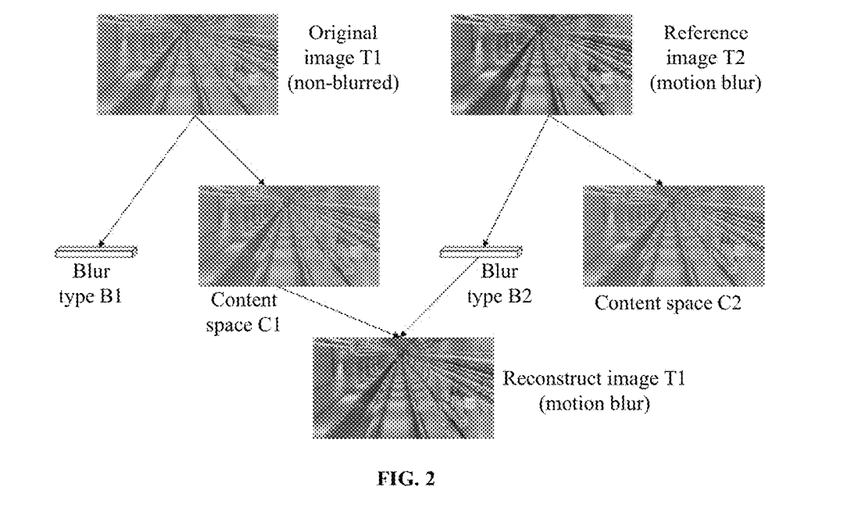
FIG. 2 is a schematic diagram of an image reconstruction process based on a content space and blur types according to Embodiment 1 of the present disclosure.

First, a basic definition is given as the principle of subsequent network construction. An image T is represented by a binary group (C, B). C is an original content space of the image, and B is a blur type of the image. Different images may share the original content space (a tunnel environment, a railway track, an annunciator, a kilometer post, etc.), and have different blur types exclusively. The combination of the same content space with different blur types can generate diverse blurred images, thereby improving the completeness of test cases, as shown in FIG. 2.

Figure 3:
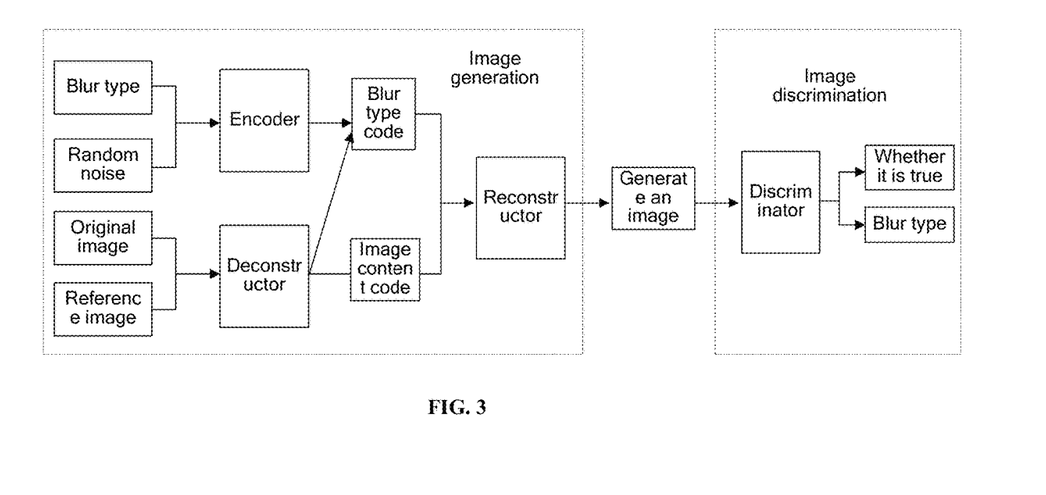
FIG. 3 is a schematic diagram of a logical relationship between modules in a GAN-based image generation network according to Embodiment 1 of the present disclosure.

On the basis of the above definition, a GAN-based image generation network is constructed to convert an original image into a blurred image. The network is mainly composed of four modules: an encoder, a deconstructor, a reconstructor, and a discriminator. A logical relationship between the modules in the image generation network is shown in FIG. 3.

The specific structure and functions of each module are described as follows:

1) Encoder

Input thereof is: a random noise and a specified image blur type.

Output thereof is: a blur type code corresponding to the specified image blur type.

The encoder is composed of a six-layer MLP fully connected network with multiple output branches. By randomly sampling latent vectors, style representations of all blur types are effectively learned, and different blur type codes are generated.

2) Deconstructor

Input thereof is: an original image or a reference image. In this embodiment, during training of the model, the original image is a non-blurred training image, and the reference image is a blurred training image. When the trained image generation model is used to generate an image, the original image is a real non-blurred image, and the reference image is a reference blurred image.

Output thereof is: blur type code and image content code of this image.

The deconstructor is constructed by using four down-sampling layers and a convolutional neural network with n output branches, where n is a number of blur types. First, through down-sampling, dimensions of the image are reduced and effective information is retained. Then, typical blur features and content features of the image are extracted by a convolutional layer, and are finally inputted into a fully connected layer for obtaining a blur type code and an image content code. The image content code in this embodiment is a multi-dimensional tensor (array) in format, which corresponds to basic content of the image (a tunnel environment, a railway track, an annunciator, a kilometer post, etc.) and may be understood as a mapping, and the same is true for the blur type code.

3) Reconstructor

Input thereof is: an image content code and a blur type code.

Output thereof is: a reconstructed image with a blur type corresponding to the blur type code and image content corresponding to the content code.

A four-layer MLP network is adopted to extract blur type code features, four residual layers are used to extract image content code features, and an AdaIN algorithm is adopted in the normalization step to fuse the blur type code and the image content code. Finally, four up-sampling layers are connected to form the reconstructor, and a new image with the same size as the original image is reconstructed.

4) Discriminator

Input thereof is: a reconstructed image generated by the reconstructor.

Output thereof is: whether the image is a real image and a blur type corresponding thereto.

Figure 4:
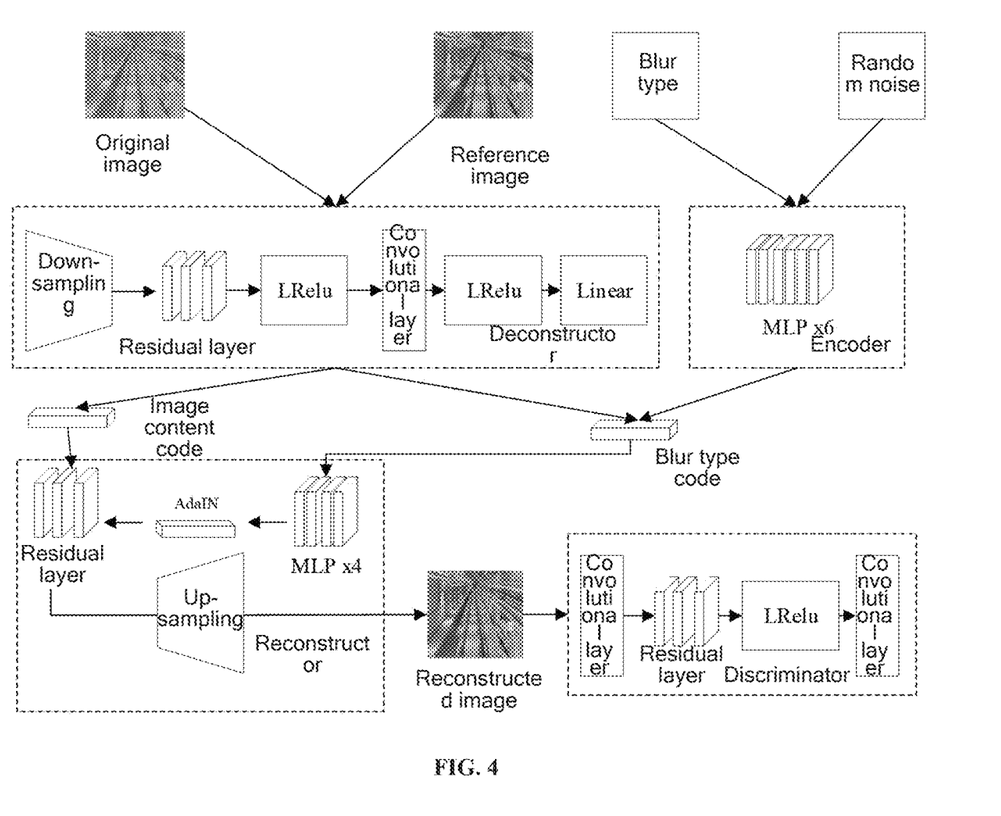
FIG. 4 is a schematic diagram of a frame structure of a GAN-based image generation network according to Embodiment 1 of the present disclosure.

The discriminator is constructed by using two convolutional layers and six residual layers. The output is a multi-branch structure. Each branch corresponds to one blur type, and binary classification is used to determine whether the image is of this blur type. The specific frame structure of the image generation network is shown in FIG. 4.

Then images of different blur types are selected from the above real environment image library, to construct a model training set, a corresponding loss function is designed to constrain and guide an updating direction of parameters of the neural network model, and the neural network model is trained by using a gradient descent method to obtain an image generation model. During training, images must be in a same scenario, and the model is trained by using a training set. The training set is composed of an original image set and n image sets of different blur types. During model training, one original image and one blurred image are read in each iteration (sequentially extracted from the n image sets of different blur types), and the two images are taken as the input.

Specifically, in this embodiment, the training a GAN-based image generation network with non-blurred training images, blurred training images of any blur type in a same scenario and a preset blur type as inputs, and reconstructed blurred images and a corresponding blur type as outputs, to obtain an image generation model specifically includes the following steps.

In Step 1, a non-blurred training image T and a blurred training image R of any blur type in a same scenario are inputted into a GAN-based image generation network, where the GAN-based image generation network includes a deconstructor, an encoder, a reconstructor, a discriminator, and an optimizer.

In Step 2, a content code $T_c$ and a blur type code $T_b$ of the non-blurred training image T and a content code $R_c$ and a blur type code $R_b$ of the blurred training image R are obtained by using the deconstructor.

In Step 3, a preset blur type I is set. I in this embodiment is a specific blur type value, which sequentially takes values in the range of blur types for subsequent reconstruction training.

In Step 4, random noise is mapped into a blur type code $I_b$ conforming to the preset blur type I by using the encoder.

In Step 5, the content code $T_c$ and the blur type code $T_b$ of the non-blurred training image T, the content code $R_c$ and the blur type code Rb of the blurred training image R and the blur type code Ib of the preset blur type I are subjected to self-reconstruction and cross-reconstruction by using the reconstructor, to obtain a reconstruction result.

In this embodiment, the content code Tc and the blur type code Tb of the non-blurred training image T are inputted into the reconstructor for self-reconstruction, to obtain non-blurred self-reconstructed image RebT.

The content code Rc and the blur type code Rb of the blurred training image R are inputted into the reconstructor for self-reconstruction, to obtain blurred self-reconstructed image RebR.

The content code Tc of the non-blurred training image T and the blur type code Rb of the blurred training image R are inputted into the reconstructor for cross-reconstruction to obtain first cross-reconstructed image CrossT1.

The content code Tc of the non-blurred training image T and the blur type code Ib of the preset blur type I are inputted into the reconstructor for cross-reconstruction to obtain second cross-reconstructed image CrossT2.

In Step 6, the reconstruction result, the non-blurred training image T and the blurred training image R are inputted into the discriminator to obtain a discrimination result.

In Step 7, based on the discrimination result, each loss function is calculated and back propagation is performed to obtain a gradient of each parameter of the image generation network.

In this embodiment, the process of calculating each loss function specifically includes:
calculating a reconstruction loss:

$$\text{Loss}(Reb)=0.5*(L1\text{Loss}(T, RebT)+L1\text{Loss}(R, RebR)),$$

where L1Loss( ) is a basic loss function, RebT represents the non-blurred self-reconstructed image, and RebR represents the blurred self-reconstructed image; and
calculating a discrimination loss:

$$\text{Loss}(Dis)=0.25*(L1\text{Loss}(Dis(7),Dis(Reb7))+L1\text{Loss}(Dis(R),Dis(RebR))+L1\text{Loss}(Dis(R),Dis(CrossT1))+L1\text{Loss}(I,Dis(CrossT2))),$$

where Dis(T) is a discrimination result of the non-blurred training image T, Dis(R) is a discrimination result of the blurred training image R, Dis(RebT) is a discrimination result of the non-blurred self-reconstructed image, Dis(RebR) is a discrimination result of the blurred self-reconstructed image, Dis(CrossT1) is a discrimination result of the first cross-reconstructed image, and Dis(CrossT2) is a discrimination result of the second cross-reconstructed image.

In Step 8, each parameter of the image generation network is optimized based on the gradient by using the optimizer, to obtain the image generation model by iteration.

In an alternative implementation, during model training in this embodiment, the deconstructor is responsible for deconstructing an image to obtain a content code and a blur type code of the image, and the encoder is responsible for mapping random noise into a blur type code. After being obtained from the above two sources, the image content code and the blur type code are inputted into the reconstructor for reconstruction to obtain a new image. The discriminator is responsible for discriminating the image generated by the reconstructor, specifically determining whether the image is a real image or an image generated by the reconstructor, and giving a blur type category corresponding to the image.

The specific steps of each iterative training are as follows.

In D1, a non-blurred training image and a blurred training image are deconstructed to obtain content codes and blur codes of the images.

In D2, the content codes and the blur codes are reconstructed to obtain reconstructed images.

In D3, the non-blurred training image, the blurred training image and the reconstructed image are inputted into the discriminator to obtain a blur type of each image.

In D4, a loss value of this iteration is calculated with the non-blurred training image, the blurred training image and the reconstructed image, the content codes and the blur codes of the non-blurred training image and the blurred training image, and the blur type of each image as inputs of the loss function.

In D5, back propagation is performed based on the loss value, and parameters of the deconstructor, the encoder, the reconstructor and the discriminator (i.e., connection weights and biases of all neural networks) are updated, thereby completing this iteration.

Termination conditions of iteration is: the number of iteration steps reaches M (the maximum number of iteration steps preset before training), or the loss value does not continue to decline (that is, the value reaches the local optimum) after consecutive N iterations (N is a preset value before training).

A specific implementation method and necessary explanation of the above iterative process are as follows:

In step D1 of the iteration, blur training images R are images of different blur types, a blur type is a combination of a blur intensity and a blur angle, and different blur types are obtained from different combinations.

Content codes are obtained by inputting the non-blurred training images T and the blurred training images R into the deconstructor, and the content codes obtained from the two types of images are denoted as Tc and Rc respectively.

Blur type codes are obtained in following two ways:
1) T and R are inputted into the deconstructor to obtain blur type codes of two types of images, which are denoted as Tb and Rb respectively. 2) A specified preset blur type (denoted as I) is preset, and the encoder maps, based on I, random noise into a blur type code Ib conforming to I.

In step D2 of the iteration, the obtained image content code and blur type code are self-reconstructed and cross-reconstructed, which includes the following specific steps:
a): inputting Tc and Tb into the reconstructor for self-reconstruction to obtain a self-reconstructed image RebT of the original image.
b): inputting Rc and Rb into the reconstructor for self-reconstruction to obtain a self-reconstructed image RebR of the reference image.
c): inputting Tc and Rb into the reconstructor for cross-reconstruction to obtain a cross-reconstructed image CrossT1.
d): inputting Tc and Ib into the reconstructor for cross-reconstruction to obtain a cross-reconstructed image CrossT2.

In step D3 of the iteration, T, R, RebT, RebR, CrossT1 and CrossT2 are inputted into the discriminator to obtain Dis(T), Dis(R), Dis(RebT), Dis(RebR), Dis(CrossT1), and Dis(CrossT2).

In step D4 of the iteration, each loss function is calculated, where L1Loss( ) is a basic loss function, which has a function of calculating an average absolute error between each element in input x and corresponding element in target y. Specific steps and formulas are as follows.

a) A reconstruction loss is Loss(Reb)=0.5*(L1Loss(T, Reb7)+L1Loss(R, RebR)), which is used to restore the original image to its original state as much as possible after the original image is processed by the deconstructor and reconstructor.
b) An discrimination loss is Loss(Dis)=0.25*(L1Loss(Dis (7), Dis(Reb7))+L1Loss(Dis(R), Dis(RebR))+L1Loss (Dis(R), Dis(CrossT1))+L1Loss(I, Dis(CrossT2))), which is used to make a generated fake image as similar as possible to the original real image.

In step D5 of the iteration, errors of the above loss functions are solved and are back-propagated, to update parameters of the deconstructor, the encoder, the reconstructor, and the discriminator; and optimal parameters of each module are finally determined through many iterations to implement dynamic balance, and obtain a trained image generation model.

A general principle for training a deep learning model is as follows (taking model training using a pytorch framework as an example).

A loss function criterion is defined first, and then a loss value loss is obtained by calculating the error of the loss function in each iteration. Then the back propagation of the errors is performed by means of loss.backward (this function completes the automatic derivation by means of an inherent mechanism of pytorch to obtain a gradient of each parameter). After the gradient of each parameter is obtained through the back propagation of loss, an optimizer (i.e., an optimization algorithm, which may be invoked directly by means of the package torch.optim for implementing various optimization algorithms in pytorch) is defined. The parameters that need to be updated (connection weights and biases of all neural networks in the above four modules) are transmitted to the optimizer, and the optimizer calculates values of updated parameters by using the optimization algorithm, thereby completing one training iteration.

During model training, the maximum number of iteration steps is generally set artificially, and the training stops when the model training reaches the maximum number of iteration steps. If this method is adopted, it is required to manually tune the training for many times according to experience (setting different number of training steps, optimization algorithms, loss functions, etc.), and then determine a parameter result of specific training as the parameter of the final model. Alternatively, the maximum number of iteration steps may be manually specified first, and an early stop parameter k (early stop) is additionally set. A total loss value is determined after each round of model training is completed, and if the loss value does not decrease after consecutive k rounds of training, it is determined that the model has been trained to converge, and the iterative training is directly ended even if the maximum number of iteration steps has not been reached, where the value of k also needs to be given by people according to experience, the most suitable k value is determined through training for many times, and thus it is usually impossible to give a universal specific value. The second method is used in this embodiment.

In S4, real non-blurred images and target reference data are inputted into the image generation model to generate target reconstructed blurred images and corresponding blur types, where the target reference data is reference blurred images or a specified blur type, and the reference blurred images are in a same scenario as the real non-blurred images.

The real non-blurred images and the reference blurred images in the above real environment image library are inputted into the image generation model, and the model retains a content of each real non-blurred image, absorbs a style of the reference blurred image, and generates target reconstructed blurred images that are of the same blur type as the reference blurred images. Alternatively, target reconstructed blurred images conforming to a specified blur type can be generated only by inputting the specified blur type and the real non-blurred images into the image generation model without specifying the reference blurred images.

Specifically, there are two cases.

In the first case, when inputs are the real non-blurred images and the reference blurred images, each reference blurred image is deconstructed by the deconstructor of the image generation model, to obtain a first reference blur type code.

Each real non-blurred image is deconstructed by the deconstructor of the image generation model to obtain a real image content code.

The first reference blur type code and the real image content code are fused by the reconstructor of the image generation model to reconstruct a target reconstructed blurred image that is in a same scenario as the real non-blurred image and is of the same blur type as the reference blurred image.

A blur type of the target reconstructed blurred image is obtained by the discriminator of the image generation model.

In the second case, when inputs are the real non-blurred image and the specified blur type, a second reference blur type code is obtained by the encoder of the image generation model based on the specified blur type (a random vector is mapped with the specified blur type to obtain the corresponding blur type code).

The real non-blurred image are deconstructed by the deconstructor of the image generation model to obtain a real image content code.

The second reference blur type code and the real image content code are fused by the reconstructor of the image generation model to reconstruct target reconstructed blurred image that is in a same scenario as the real non-blurred image and is of a blur type being the specified blur type.

A blur type of the target reconstructed blurred image is obtained by the discriminator of the image generation model.

In S5, a structural similarity between the target reconstructed blurred image and the real non-blurred image is calculated.

A formula for calculating a structural similarity is as follows:

$$SSIM(x, y) = \frac{(2\mu_x\mu_y + W_1)(2\sigma_x\sigma_y + W_2)}{(\mu_x^2 + \mu_y^2 + W_1)(\sigma_x^2 + \sigma_y^2 + W_2)},$$

where $\mu_x$ and $\mu_y$ are average pixel values of generated target reconstructed blurred image x and real non-blurred image y (which are obtained by averaging pixel values of all pixels in the images), $\sigma_x$ and $\sigma_y$ are standard deviations of the generated target reconstructed blurred image x and the real non-blurred image y (which are standard deviations of image pixel value matrices), $\sigma_{xy}$ is a covariance of the generated target reconstructed blurred image x and the real non-blurred image y (which is covariance between image pixel value matrices), and $W_1$ and $W_2$ are constants set to avoid system instability when a denominator is close to 0.

In S6, target reconstructed blurred image with a structural similarity lower than a set threshold is deleted to obtain test cases.

A filtering threshold a is set according to test requirements, any integer falling within a range (0, 10) is selected in this embodiment. If the structural similarity between the generated target reconstructed blurred image x and the real non-blurred image y is lower than the filtering threshold a, it is determined that the target reconstructed blurred image x are distorted greatly in structure compared with the real non-blurred image y, and are removed; and all images with similarities higher than the threshold are retained.

Then, the test cases are inputted into a tested visual train positioning model. It is determined that a test is passed (a tested object is qualified) if the visual train positioning model is capable of correctly identifying image information of the test cases and correctly implementing train positioning; otherwise, it is determined that the test fails (the failure of the test means that the tested object has an defect that does not meet the requirements and is found by the testing).

In this embodiment, after being obtained, the test cases are combined and selected according to a desired output, to determine final test cases. Specific values (the blur angle and the blur intensity) of the blur type of the test cases are obtained and it is determined whether the specific values are in a given threshold interval, if so, the desired output is assigned {True, image information (such as the content of a kilometer post in the image)}; otherwise a desired output is assigned {Null}. If the test purpose is to test accuracy of the model, all candidate test cases with a desired output being true are selected as final test cases; and if the test purpose is to test a false recognition rate of the model, some candidate test cases with a desired output being null may be added as final test cases.

The above final test cases are used for testing. The final test cases are inputted into a tested visual train positioning model, and output results of the model are collected. If the desired output of the test cases is {True, image information}, the model correctly identifies image information (such as visual labels and key point features) and correctly implements train positioning, the test is passed; and if the model fails to correctly identify the image information, resulting in wrong train positioning or failure in positioning, it is determined that the test fails. If the desired output of the test cases is {Null} and the result given by the model is null, the test is passed. If the model gives a result (which must be a wrong result), the test fails. According to the test results, the safety and reliability of the tested visual train positioning model can be further improved, and the application scope of the tested visual train positioning model can also be defined.

Figure 5:
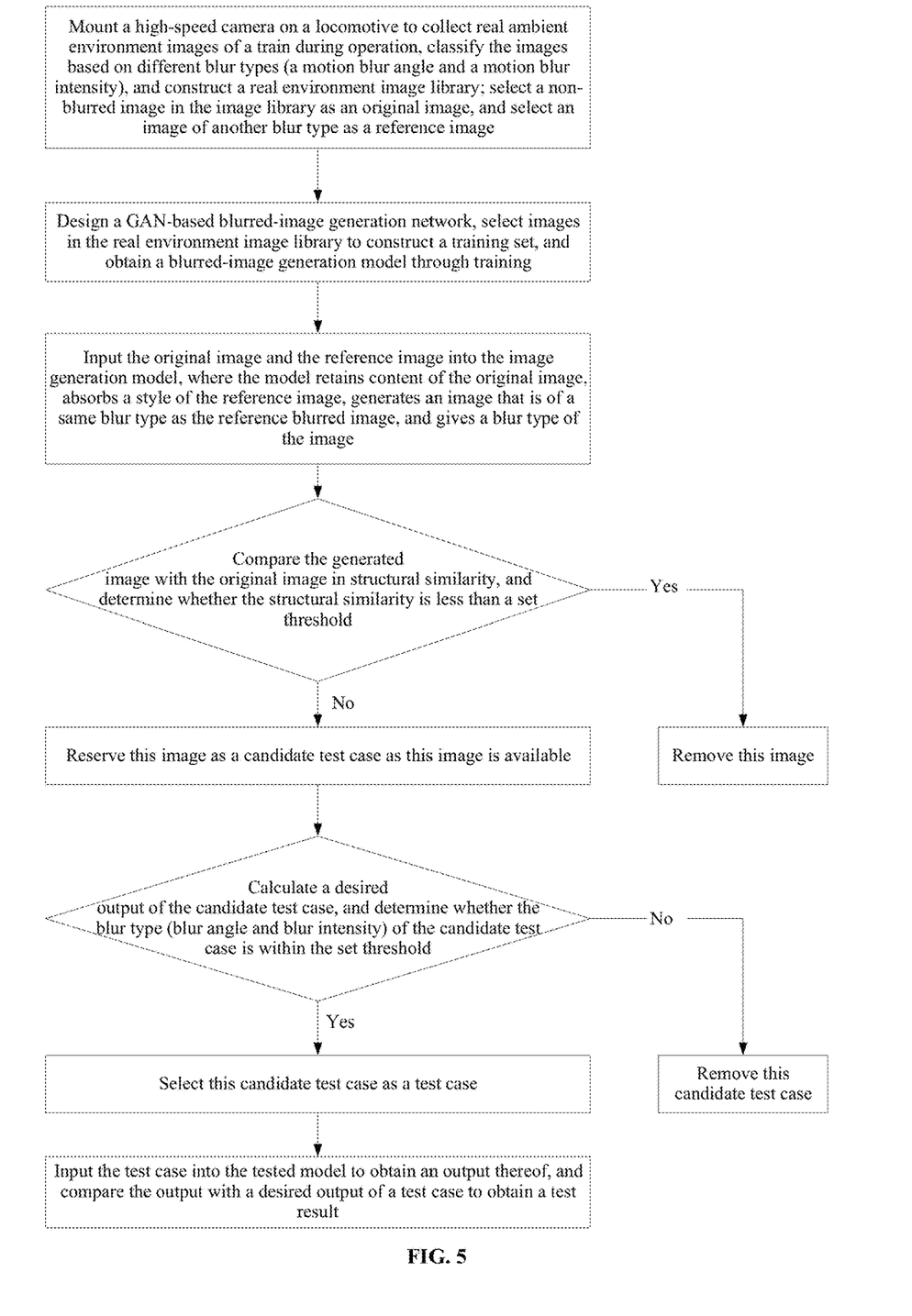
FIG. 5 is a flowchart of detailed steps of a method for generating test cases for visual train positioning according to Embodiment 1 of the present disclosure.

A detailed step flowchart of the method for generating test cases for visual train positioning in this embodiment is shown in FIG. 5. The generated test cases have high completeness, and can effectively expose errors that may occur when the tested visual train positioning model is encountered with different degrees of blur interference, so that hidden dangers can be found out before an accident occurs. After the model training is completed, the same original image can be transformed into different blur types by inputting reference images of different blurred scenarios, which enhances the diversity of data and is more likely to lead to positioning errors of the model, thereby effectively exposing the hidden dangers of the model.

In this embodiment, the test case generation efficiency is high. The motion blur of an image obtained by photographing a train running at a high speed is one of typical scenarios of the train operation, and easily leads to visual train positioning errors. In this embodiment, test cases with such interference can be quickly generated. Compared with a manual method which requires steps of setting, searching, collecting and filtering in a real environment, this method can be used to directionally generate test images of a specified blurred scenario, so the efficiency is improved.

The cost of generating test cases in this embodiment is low, and a large number of test cases can be generated with a small number of samples. For a visual subway train positioning task, only after the training of an initial model is completed, a large number of images as test cases can be quickly generated from a small number of original seed images by setting different parameters, which has high reusability and data augmentation capability. Manual methods require the building of a real train, track, tunnel, signal lights, etc. as a test environment, so that the cost is higher. In addition, in this embodiment, rules can also be manually constructed, and image pixel values are manually modified according to characteristics of different blurred scenarios to generate images meeting requirements as test cases.

Embodiment 2

Figure 6:
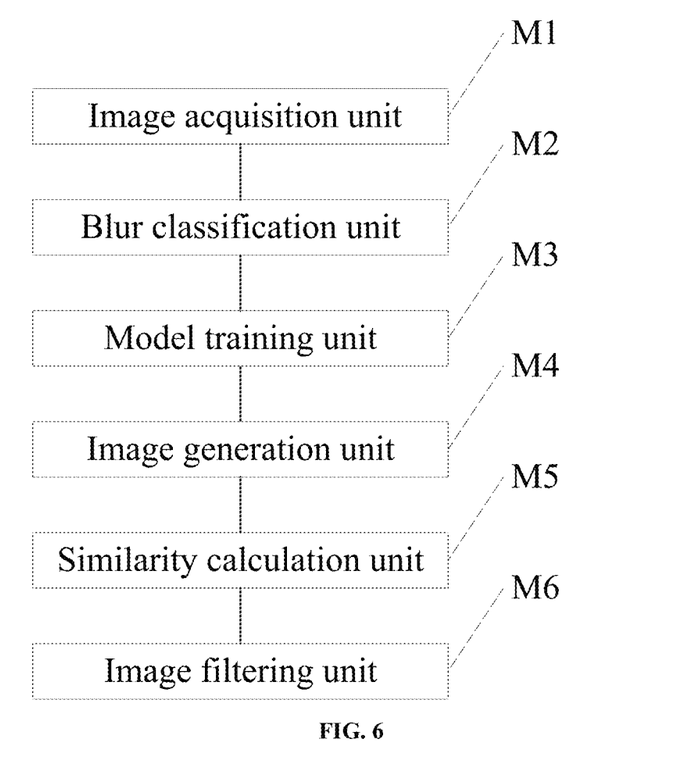
FIG. 6 is a block diagram of a system for generating test cases for visual train positioning according to Embodiment 2 of the present disclosure.

As shown in FIG. 6, this embodiment provides a system for generating test cases for visual train positioning, including:
- an image acquisition unit M1, configured to obtain real environment images around a train;
- a blur classification unit M2, configured to classify the real environment images based on blur types to obtain a plurality of blur types of blurred training images;
- a model training unit M3, configured to train a GAN-based image generation network with each non-blurred training image, each blurred training image of any blur type in a same scenario and a preset blur type as inputs, and a reconstructed blurred image and a corresponding blur type as outputs, to obtain an image generation model, where a scenario of the reconstructed blurred image is the same as that of the non-blurred training image, and the blur type of the reconstructed blurred image is the same as that of the blurred training image or the preset blur type;
- an image generation unit M4, configured to input each real non-blurred image and target reference data into the image generation model to generate a target reconstructed blurred image and a corresponding blur type, where the target reference data is a reference blurred image or a specified blur type, and the reference blurred image is in a same scenario as the real non-blurred image;
- a similarity calculation unit M5, configured to calculate a structural similarity between the target reconstructed blurred image and the real non-blurred image; and
- an image filtering unit M6, configured to delete, from generated target reconstructed blurred images, target reconstructed blurred images with structural similarities lower than a set threshold to obtain test cases.

Each embodiment of this description is described in a progressive manner, each embodiment focuses on the difference from other embodiments, and for the same and similar parts between the embodiments, reference may be made to each other. Since the system disclosed in an embodiment corresponds to the method disclosed in another embodiment, the description is relatively simple, and reference may be made to the method description.

Specific examples are used herein to explain the principles and implementations of the present disclosure. The foregoing description of the embodiments is merely intended to help understand the method of the present disclosure and its core ideas; furthermore, for those of ordinary skill in the art, various modifications of specific implementations and the scope of application may be made in accordance with the ideas of the present disclosure. In conclusion, the content of this description shall not be construed as limitations to the present disclosure.

What is claimed is:

1. A method for generating test cases for visual train positioning, comprising:

obtaining real environment images around a train at a predetermined position;

classifying the real environment images based on blur types to obtain a plurality of blur types of blurred training images;

training a generative adversarial network (GAN)-based image generation network with each non-blurred training image, each blurred training image of any blur type in a same scenario and a preset blur type as inputs, and a reconstructed blurred image and a corresponding blur type as outputs, to obtain an image generation model, wherein a scenario of the reconstructed blurred image is the same as a scenario of the non-blurred training image, and the blur type of the reconstructed blurred image is the same as the blur type of the blurred training image or the preset blur type;

inputting each real non-blurred image and target reference data into the image generation model to generate a target reconstructed blurred image and a corresponding blur type, wherein the target reference data is a reference blurred image or a specified blur type, and the reference blurred image is in a same scenario as the real non-blurred image;

calculating a structural similarity between the target reconstructed blurred image and the real non-blurred image; and deleting, from generated target reconstructed blurred images, target reconstructed blurred images with structural similarities lower than a set threshold to obtain test cases;

inputting each of the test cases into an existing visual train positioning model based on deep learning technology, to identify an image information and a position in corresponding test case;

comparing the identified image information and the identified position with an image information of the corresponding test case and the predetermined position respectively, and determining that the existing visual train positioning model fails to pass a test, in responding to a comparison result that the identified image information and the identified position do not match with the image information of the corresponding test case and the predetermined position respectively.

2. The method for generating test cases for visual train positioning according to claim 1, wherein each blur type comprises a blur angle and a blur intensity.

3. The method for generating test cases for visual train positioning according to claim 1, wherein the training a GAN-based image generation network with each non-blurred training image, each blurred training image of any blur type in a same scenario and a preset blur type as inputs, and a reconstructed blurred image and a corresponding blur type as outputs, to obtain an image generation model comprises:

inputting a non-blurred training image T and a blurred training image R of any blur type in a same scenario into the GAN-based image generation network, wherein the GAN-based image generation network includes a deconstructor, an encoder, a reconstructor, a discriminator, and an optimizer;

obtaining a content code Tc and a blur type code Tb of the non-blurred training image T and a content code Rc and a blur type code Rb of the blurred training image R by using the deconstructor;

setting a preset blur type I;

mapping random noise into a blur type code Ib conforming to the preset blur type I by using the encoder;

performing self-reconstruction and cross-reconstruction on the content code Tc and the blur type code Tb of the non-blurred training image T, the content code Rc and the blur type code Rb of the blurred training image R and the blur type code Ib of the preset blur type I by using the reconstructor, to obtain a reconstruction result;

inputting the reconstruction result, the non-blurred training image T and the blurred training image R into the discriminator to obtain a discrimination result;

calculating each loss function based on the discrimination result and performing back propagation to obtain a gradient of each parameter of the image generation network; and optimizing each parameter of the image generation network based on the gradient by using the optimizer, and obtaining the image generation model by iteration.

4. The method for generating test cases for visual train positioning according to claim 3, wherein the performing self-reconstruction and cross-reconstruction on the content code Tc and the blur type code Tb of the non-blurred training image T, the content code Rc and the blur type code Rb of the blurred training image R and the blur type code Ib of the preset blur type I by using the reconstructor, to obtain a reconstruction result comprises:

inputting the content code Tc and the blur type code Tb of the non-blurred training image T into the reconstructor for self-reconstruction to obtain a non-blurred self-reconstructed image RebT;

inputting the content code Rc and the blur type code Rb of the blurred training image R into the reconstructor for self-reconstruction to obtain a blurred self-reconstructed image RebR;

inputting the content code Tc of the non-blurred training image T and the blur type code Rb of the blurred training image R into the reconstructor for cross-reconstruction to obtain a first cross-reconstructed image CrossT1; and inputting the content code Tc of the non-blurred training image T and the blur type code Ib of the preset blur type I into the reconstructor for cross-reconstruction to obtain a second cross-reconstructed image CrossT2.

5. The method for generating test cases for visual train positioning according to claim 3, wherein the calculating each loss function based on the discrimination result comprises:

calculating a reconstruction loss Loss(Reb)=0.5*(L1Loss (T, Reb7)+L1Loss(R, RebR)), wherein L1Loss( ) is a basic loss function, RebT represents the non-blurred self-reconstructed image, and RebR represents the blurred self-reconstructed image; and calculating a discrimination loss Loss(Dis)=0.25* (L1Loss(Dis(7), Dis(Reb7))+L1Loss(Dis(R), Dis (RebR))+L1Loss(Dis(R), Dis(CrossT1))+L1Loss(I, Dis(CrossT2))), wherein Dis(T) is a discrimination result of the non-blurred training image T, Dis(R) is a discrimination result of the blurred training image R, Dis(RebT) is a discrimination result of the non-blurred self-reconstructed image, Dis(RebR) is a discrimination result of the blurred self-reconstructed image, Dis(CrossT1) is a discrimination result of the first cross-reconstructed image, and Dis(CrossT2) is a discrimination result of the second cross-reconstructed image.

6. The method for generating test cases for visual train positioning according to claim 1, wherein the inputting each real non-blurred image and target reference data into the image generation model to generate a target reconstructed blurred image and a corresponding blur type comprises:
deconstructing, the reference blurred image by a deconstructor of the image generation model to obtain a first reference blur type code when the real non-blurred image and the reference blurred image are inputted;
deconstructing the real non-blurred image by the deconstructor of the image generation model to obtain a real image content code;
fusing the first reference blur type code and the real image content code by a reconstructor of the image generation model to reconstruct the target reconstructed blurred image that is in a same scenario as the real non-blurred image and is of a same blur type as the reference blurred image;
obtaining the blur type of the target reconstructed blurred image by the discriminator of the image generation model;
obtaining a second reference blur type code based on the specified blur type, when the real non-blurred image and the specified blur type are inputted;
deconstructing the real non-blurred image by the deconstructor of the image generation model to obtain a real image content code;
fusing the second reference blur type code and the real image content code by the reconstructor of the image generation model to reconstruct the target reconstructed blurred image that is in a same scenario as the real non-blurred image and is of a blur type being the specified blur type; and
obtaining the blur type of the target reconstructed blurred images by the discriminator of the image generation model.

7. The method for generating test cases for visual train positioning according to claim 1, wherein a formula for calculating the structural similarity is as follows:

$$SSIM(x, y) = \frac{(2\mu_x\mu_y + W_1)(2\sigma_x\sigma_y + W_2)}{(\mu_x^2 + \mu_y^2 + W_1)(\sigma_x^2 + \sigma_y^2 + W_2)},$$

wherein $\mu_x$ and $\mu_y$ are average pixel values of a generated target reconstructed blurred image x and a real non-blurred image y, respectively, $\sigma_x$ and $\sigma_y$ are standard deviations of the generated target reconstructed blurred image x and the real non-blurred image y, respectively, and $W_1$ and $W_2$ are constants set to avoid system instability when a denominator is close to 0.

8. The method for generating test cases for visual train positioning according to claim 1, wherein after the deleting, from generated target reconstructed blurred images, target reconstructed blurred images with structural similarities lower than a set threshold to obtain test cases, the method further comprises:

inputting each test case into a tested visual train positioning model; and
determining that a test is passed if the visual train positioning model is capable of correctly identifying image information of the test case and correctly implementing train positioning; otherwise, determining that the test fails.

9. The method for generating test cases for visual train positioning according to claim 1, wherein the classifying the real environment images based on blur types to obtain a plurality of blur types of blurred training images comprises:
calculating blur types of the real environment images by using a cepstrum method; and
classifying the real environment images into the plurality of blur types of the blurred training images based on the blur types.

10. A system for generating test cases for visual train positioning, comprising a processor and a memory, wherein the processor is configured to perform a method for generating text cases for visual train positioning, which comprises:
obtaining real environment images around a train at a predetermined position;
classifying the real environment images based on blur types to obtain a plurality of blur types of blurred training images;
training a generative adverarial network (GAN)-based image generation network with each non-blurred training image, each blurred training image of any blur type in a same scenario and a preset blur type as inputs, and a reconstructed blurred image and a corresponding blur type as outputs, to otain an image generation model, wherein a scenario of the reconstructed blurred image is the same as a scenario of the non-blurred training image, and the blur type of the reconstructed blurred image is the same as the blur type of the blurred training image or the preset blur type;
inputting each real non-blurred image and target reference data into the image generation model to generate a target reconstructed blurred image and a corresponding blur type, wherein the target reference data is a reference blurred image or a specified blur type, and the reference blurred image is in a same scenario as the real non-blurred image;
calculating a structural similarity between the target reconstructed blurred image and the real non-blurred image; and
deleting, from generated target reconstructed blurred images, target reconstructed blurred images with structural similarities lower than a set threshold to obtain test cases;
inputting each of the test cases into an existing visual train positioning model based on deep learning techology, to identify an image information and a position in corresponding test case;
comparing the identified image information and the identified position with an image information of the corresponding test case and the predetermined position respectively, and determining that the existing visual train positioning model fails to pass a test, in responding to a comparison result that the identified image information and the identified position do not match with the image information of the corresponding test case and the predetermined position respectively.

* * * * *